(12) United States Patent
Baca (10) Patent No.: US 11,486,624 B2
(45) Date of Patent: Nov. 1, 2022

(54) SYSTEMS AND METHODS FOR COOLING FOOD PRODUCTS

(71) Applicant: RYLANS ENTERPRISES LLC, Las Cruces, NM (US)

(72) Inventor: Robert Baca, Las Cruces, NM (US)

(73) Assignee: RYLANS ENTERPRISES LLC, Las Cruces, NM (US)

( * ) Notice: Subject to any disclaimer, the term of this patent is extended or adjusted under 35 U.S.C. 154(b) by 249 days.

(21) Appl. No.: 16/546,147

(22) Filed: Aug. 20, 2019

(65) Prior Publication Data

US 2021/0055031 A1 Feb. 25, 2021

(51) Int. Cl.
  *F25D 13/06* (2006.01)
  *A23N 12/12* (2006.01)
  *B01D 46/00* (2022.01)
  *B01D 46/56* (2022.01)

(52) U.S. Cl.
  CPC ......... *F25D 13/067* (2013.01); *A23N 12/125* (2013.01); *B01D 46/56* (2022.01)

(58) Field of Classification Search
  CPC ... F25D 13/067; F25D 13/06; B01D 46/0019; A23N 12/125; A23B 4/06; A23B 7/0053; A22B 5/0076; A23L 3/361; A23L 3/375
  See application file for complete search history.

(56) References Cited

U.S. PATENT DOCUMENTS

| 1,550,946 | A | | 8/1925 | Braungart et al. | |
|---|---|---|---|---|---|
| 2,996,761 | A | * | 8/1961 | Banks | C11C 5/025 118/69 |
| 3,224,220 | A | | 12/1965 | Mills | |
| 3,498,208 | A | | 3/1970 | Longe et al. | |
| 3,729,773 | A | * | 5/1973 | Dillon | A22C 21/00 426/524 |
| 3,775,993 | A | | 12/1973 | Murphy | |
| 3,777,809 | A | * | 12/1973 | Milde, Jr. | F24F 5/00 165/61 |
| 3,841,391 | A | * | 10/1974 | Milde, Jr. | F24F 5/00 55/528 |
| 3,844,135 | A | | 10/1974 | Zamiara | |
| 4,000,625 | A | | 1/1977 | Beerens et al. | |
| 4,042,667 | A | * | 8/1977 | Ishiwata | B01D 53/68 95/278 |
| 4,138,860 | A | | 2/1979 | Drummond | |
| 4,199,958 | A | * | 4/1980 | Masuda | F25D 13/06 62/380 |
| 4,277,954 | A | | 7/1981 | Drummond | |
| 4,329,850 | A | | 5/1982 | Drummond | |

(Continued)

*Primary Examiner* — Frantz F Jules
*Assistant Examiner* — Martha Tadesse
(74) *Attorney, Agent, or Firm* — Loza & Loza, LLP; Kevin L. Soules (57) ABSTRACT

A method, system, and apparatus for cooling a product comprises a chilling assembly further comprising a liquid flow assembly including a main conduit, at least one delivery conduit attached to the main conduit, and at least one nozzle attached to the delivery conduit wherein liquid is distributed onto a product from the at least one nozzle; and an airflow assembly including an air pump and at least one input conduit wherein the air pump drives airflow through the input conduit; a conveyor assembly conveys the product through the chilling assembly and a drain pan is configured below the conveyor assembly for collecting drainage and waste.

20 Claims, 9 Drawing Sheets (56) References Cited

U.S. PATENT DOCUMENTS

| | | | |
|---|---|---|---|
| 4,354,357 A | | 10/1982 | Hofstetter |
| 4,361,444 A | * | 11/1982 | McClanahan .......... C23G 3/023 |
| | | | 134/28 |
| 4,422,303 A | | 12/1983 | Rothenberg et al. |
| 4,796,435 A | | 1/1989 | Mattson |
| 4,955,209 A | * | 9/1990 | Smith ....................... F25D 3/11 |
| | | | 134/135 |
| 5,184,471 A | | 2/1993 | Losacco et al. |
| 5,280,748 A | * | 1/1994 | Pardo ....................... A23L 3/10 |
| | | | 99/330 |
| 5,377,492 A | | 1/1995 | Robertson et al. |
| 5,802,961 A | | 9/1998 | Hay et al. |
| 5,809,787 A | * | 9/1998 | Zittel ...................... F25D 13/06 |
| | | | 62/380 |
| 6,387,322 B1 | | 5/2002 | Gallus |
| 6,578,370 B1 | | 6/2003 | Andress et al. |
| 2008/0178613 A1 | | 7/2008 | Smith |
| 2008/0253754 A1 | * | 10/2008 | Rubin .................... A47K 10/48 |
| | | | 392/381 |
| 2011/0120181 A1 | | 5/2011 | De Larminat et al. |
| 2012/0090194 A1 | * | 4/2012 | Wieck .................. F25D 13/067 |
| | | | 34/79 |

* cited by examiner

SYSTEMS AND METHODS FOR COOLING FOOD PRODUCTS

TECHNICAL FIELD

Embodiments are generally related to food processing. Embodiments are further related to industrial food processing. Embodiments are related to conveyor-based food processing. Embodiments are also related to chile roasters. Embodiments are related to conveyor-based cooling techniques for food processing. Embodiments are also related to conveyor-based cooling systems for processing roasted foods. Embodiments are also related to cooling chile, roasted by a chile roaster. Embodiments are further related to methods and systems for manufacturing cooling systems. Embodiments are additionally related to methods and systems for cooling roasted chile, that facilitate production efficiency and food safety.

BACKGROUND

Chile is harvested with a thick outer skin that is unpleasant to eat. In addition, roasting chile can alter the taste, by caramelizing the sugars on the surface, resulting in a more complex and desirable flavor. Thus, a preferable means for preparing chile for consumption involves roasting the chile. However, once the chile is roasted, particularly when the chile is being roasted en masse, it requires a significant amount of time for the chile to cool. The chile must be cooled before it can be safely handled and/or packaged for sale.

Current methods for roasting chile require extended cooling time. During this time, the chile may be left out in the open where it is subject to risk of contamination from many different sources. In addition, the cooling period creates a bottleneck in the production cycle of roasted chile, which is inefficient.

Accordingly, there is a need in the art for improved methods, systems, and apparatuses for cooling roasted chile, as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for cooling products.

It is another aspect of the disclosed embodiments to move product through a cooling system after roasting.

It is another aspect of the disclosed embodiments to provide a method and system for cooling roasted chile.

It is another aspect of the disclosed embodiments to provide methods, systems, and apparatuses for cooling large volumes of roasted chile quickly and efficiently.

It is yet another aspect of the disclosed embodiments to provide methods, systems, and apparatuses for providing sanitary food grade chile cooling systems that comply with regulations for food preparation equipment.

The aforementioned aspects and other objectives and advantages can now be achieved as described herein. In one embodiment, a system and/or apparatus for cooling a product comprises a chilling assembly further comprising a liquid flow assembly including a main conduit, at least one delivery conduit attached to the main conduit, and at least one nozzle attached to the delivery conduit wherein liquid is distributed onto a product from the at least one nozzle; and an airflow assembly including an air pump and at least one input conduit wherein the air pump drives airflow through the input conduit; a conveyor assembly conveys the product through the chilling assembly and a drain pan is configured below the conveyor assembly for collecting drainage and waste.

In another embodiment, a product cooling system comprises a chilling assembly further comprising: a liquid flow assembly comprising a main conduit, at least one delivery conduit attached to the main conduit, and at least one nozzle attached to the delivery conduit wherein liquid is distributed onto a product from the at least one nozzle, and an airflow assembly further comprising an air pump and at least one input conduit wherein the air pump drives airflow through the input conduit; a conveyor assembly that conveys the product through the chilling assembly; and a drain pan configured below the conveyor assembly for collecting drainage and waste.

In an embodiment, the airflow assembly further comprises a plurality of impingement baffles that direct the airflow driven through the input conduit onto the conveyor assembly. In an embodiment, impingement baffles are configured to expel heated air. In an embodiment, each of the at least one nozzles comprises a quick disconnect spray nozzle.

In another embodiment, a product cooling method comprises transporting product on a conveyor assembly, damping the product on the conveyor assembly with a liquid flow assembly, and driving an airflow onto the product on the conveyor assembly with an airflow assembly thereby cooling the product.

In an embodiment, driving the airflow onto the product on the conveyor assembly further comprises directing the airflow onto the product with a plurality of impingement baffles.

In an embodiment, the method further comprises capturing heated air rising from the product with the impingement baffles and expelling the heated air.

In an embodiment, the method further comprises driving the airflow with an air pump and filtering the air with at least one air filter In an embodiment, damping the product on the conveyor assembly further comprises providing water from a water supply to at least one nozzle with a main conduit connected to at least one delivery conduit and spraying the product with water from the at least one nozzle.

In an embodiment, the method further comprises collecting waste in a drain pan configured under a meeting point of a first table bed and a second table bed, the first table bed and the second table bed being sloped toward the meeting point. In an embodiment, the product comprises chile.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. In addition, the term "based on" may be understood as not necessarily intended to convey an exclusive set of factors and may, instead, allow for existence of additional factors not necessarily expressly described, again, depending at least in part on context.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments disclosed herein are drawn to methods, systems, and apparatuses for cooling products, and in particular for systems and methods to cool and/or chill roasted chile. Thus, while the embodiments may be described with respect to "chile," it should be understood that in other embodiments, the various methods and systems disclosed herein can be used for cooling other products, including other roasted food products.

The cooling systems disclosed herein use a conveyor belt system or assembly to move product through a cooling or chilling device. The chilling device uses a combination of moving air and water to rapidly cool the roasted product on the conveyor belt assembly.

Figure 1:
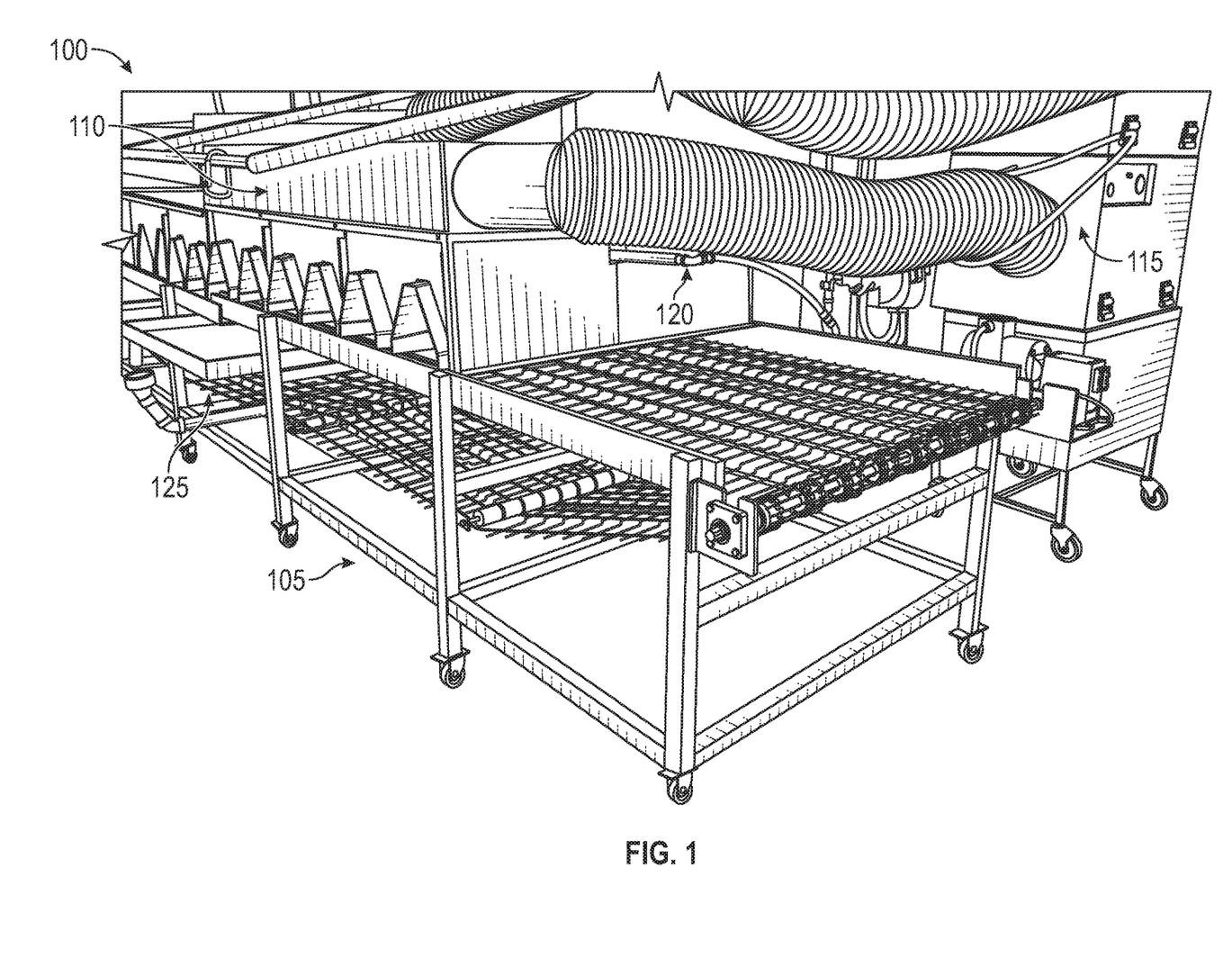
FIG. 1 depicts a product cooling system, in accordance with the disclosed embodiments.

An embodiment of a product cooling system 100 is illustrated in FIG. 1. The product cooling system 100 generally comprises a conveyor assembly 105 for transporting product through a chilling assembly 110. The chilling assembly 110 can include an airflow assembly 115 and a liquid flow assembly 120, which can be used in combination to cool product on the conveyor assembly 105. The product cooling system 100 can further include a waste and drainage system 125, which can be used to collect and dispose of waste materials that results from the cooling process.

In certain embodiments, some or all of the parts associated with the product cooling system 100 can be formed of food grade stainless steel. The connections between various components can be formed with polished welds, and fabricated radius corners can be employed to reduce or eliminate cracks and sharp corners where contamination may occur. The product cooling system 100 can thus have limited or no cracks, voids, or pinholes on any surface that will have contact with food products, to reduce or eliminate potential food born contamination of the product cooling system 100, and to make cleaning the product cooling system 100 simpler and more effective.

Figure 2A:
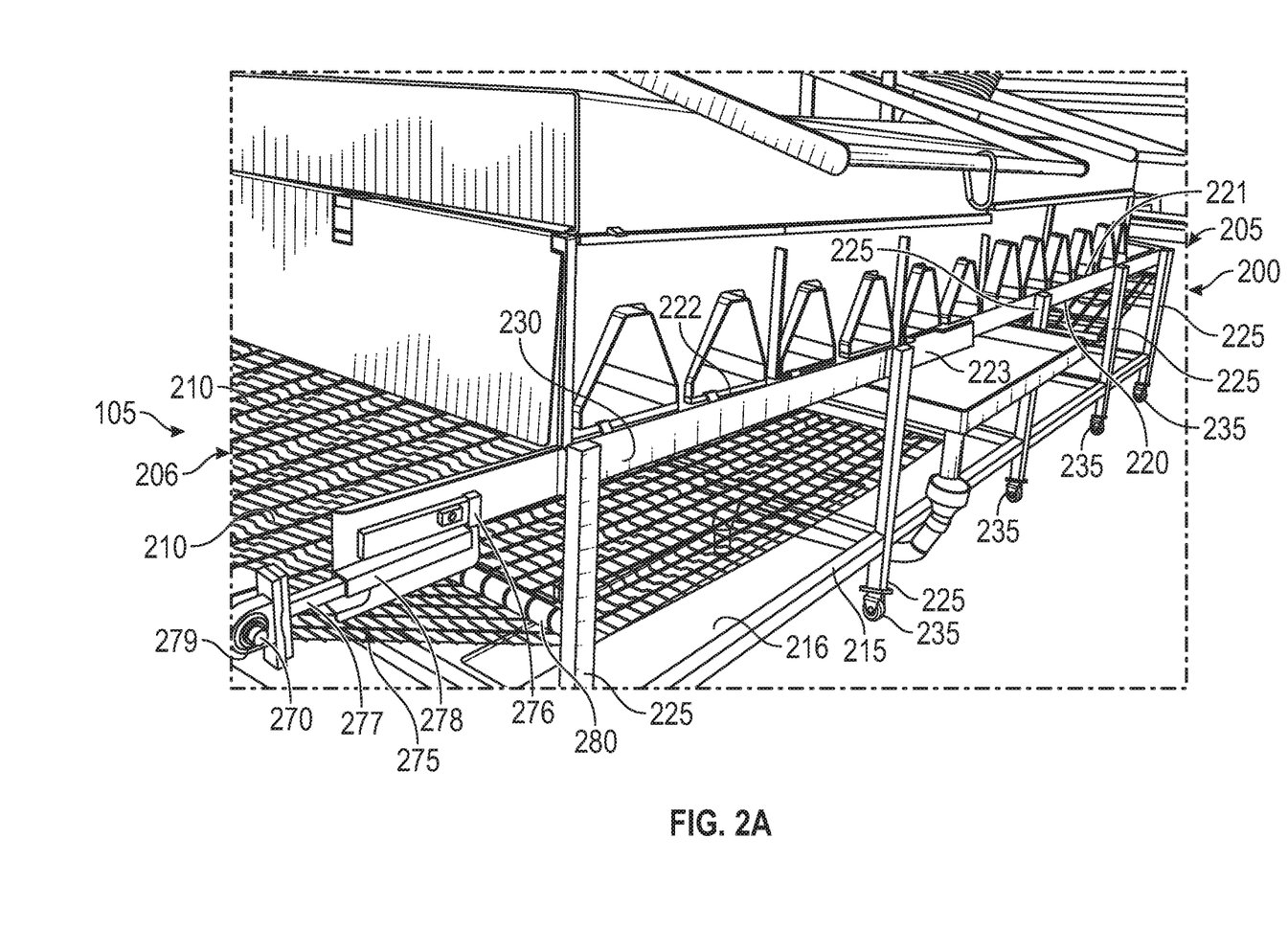
FIG. 2A depicts a conveyor assembly in accordance with the disclosed embodiments.
Figure 2B:
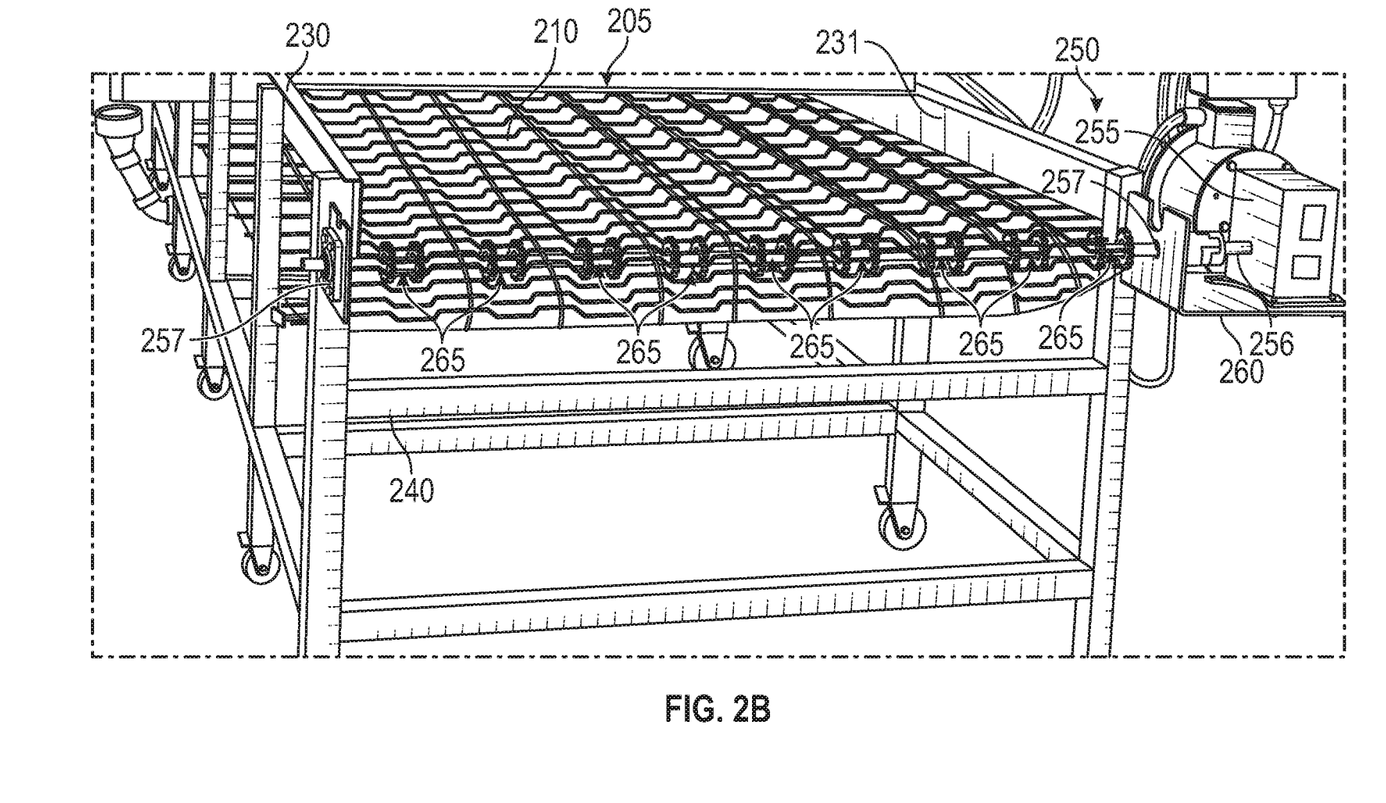
FIG. 2B depicts an end view of a conveyor assembly in accordance with the disclosed embodiments.

The conveyor assembly 105 is further detailed in FIGS. 2A and 2B. The product cooling system 100 can generally comprises a product entry end 205 and a product exit end 206. The hot product (e.g. roasted chile) can be set on the conveyor belt 210 at the product entry end 205. The conveyor belt 210 moves the product through the chilling assembly 110, to the product exit end 206, where the now-chilled product can be collected.

The frame 200 associated with the conveyor assembly 105 can comprise a bottom frame 215 and a top frame 220. The bottom frame 215 can be connected to the top frame 220 via a series of one or more structural risers 225. It should be appreciated that the structural risers 225 can be formed on both the left and right side of the frame 200. The bottom frame 215 can comprise a series of one or more connections between brace pieces. The brace pieces can be welded into a welded support structure 216 that can comprise squares or rectangles, each of which are connected in series to form the welded support structure 216. This configuration can form the bottom frame 215.

The top frame 220 provides the guide along which the top, or product transport side, of the conveyor belt 210 travels, with the product thereon. Structural risers 225 can extend from the bottom frame 215 and can be connected to a left side conveyor guide 230 and a right side conveyor guide 231. The respective conveyor guides 230 and 231 can comprise an inward facing L-shaped beam. The vertical portion of the L-shaped beam is connected (e.g. welded) to the structural riser(s) 225, and the horizontal surface serves as a conveyor belt guide, that prevents the conveyor belt from unwanted sagging. In certain embodiments, midway support braces 240 can be configured between the structural risers 225, between the bottom frame 215 and top frame 220, to lend additional structural stability to the frame 200.

In certain embodiments, the top frame 220 can further comprise two individually sloped table beds, table bed 221 and table bed 222. The table bed 221 can comprise a substantially horizontal sheet formed between conveyor guide 230 and conveyor guide 231 on the product entry side 205 of the frame 200. Similarly, table bed 222 can comprise a substantially horizontal sheet formed between conveyor guide 230 and conveyor guide 231, on the product exit side 206 of the frame 200. The conveyor belt 210 carries product from the product entry side 205 to the product exit side 206 above the table bed 221 and table bed 222.

In certain embodiments, the configuration of table bed 221 connected to conveyor guide 230 and conveyor guide 231 can be an independent piece, and the configuration of table bed 222 connected to conveyor guide 230 and conveyor guide 231 can be an independent piece. The table bed 221 and table bed 222 can be sloped slightly downward toward their meeting point 223, which can be formed above the drainage system 125. In certain embodiments, the meeting point 223 can be substantially in the middle of frame 200. The downward slope of table bed 221 and table bed 222 allows water and other solid waste to naturally flow to the meeting point 223. The meeting point 223 can form a gap between table bed 221 and table bed 222 that allows the water and other solid waste to fall into the drainage system 125. The distance of the gap can be selected to ensure that the desired material enters the drainage system 125. The slight slope of table bed 221 and table bed 222 also facilitates cleaning of the system as water and other waste naturally flows and drains at the meeting point 223.

Each of the structural risers 225 can be fitted at its bottom end, with a roller 235, which can comprise a caster, wheel, or the like, so that the entire product cooling system 100 can be rolled from one point to another.

The conveyor assembly 105 can further include a drive assembly 250, that is used to drive the conveyor belt 210. The drive assembly 250 comprises a motor 255 on the product entry end 205 of the frame 200. The motor 255 can comprise an electric variable frequency drive controlled motor, or other such motor, suitable for driving a drive shaft, such as drive shaft 256. The motor 255 can have controls that allow a user to adjust the speed at which the conveyor belt 210 is driven, and by extension, the time the product is exposed to cooling in the chilling assembly 110.

The motor 255 is mounted on mounting plate 260 that is connected (e.g. welded) to the exterior side of the conveyor guide 231. The mounting plate 260 can alternatively be connected to the exterior side of the conveyor guide 230 in other embodiments. A drive shaft 256 can be operably connected to the motor 255. The drive shaft 256 can have a series of cogs 265 deployed along its length. The cogs 265 include teeth configured to engage the conveyor belt 210. As the motor 255 turns the drive shaft 256 the cogs 265 pull the conveyor belt 210.

The conveyor assembly 105 further comprises a race and bearing assembly 257 formed on the conveyor guides 230 and 231. The race and bearing assemblies 257 allow the drive shaft 256 to spin in its engaged location between the conveyor guide 230 and conveyor guide 231. The bearings can comprise food grade washdown rated bearings.

The conveyor belt 210 can comprise a continuous loop of stainless steel chain link, formed into a belt. In other embodiments, the conveyor belt 210 can be configured of other materials. The conveyor belt 210 can have a width that substantially matches, or is slightly less than the distance between the conveyor guides 230 and 231. The conveyor belt 210 is guided along the top frame 220 to a freewheeling roller 270 formed on the product exit end 206 of the frame 200. In certain embodiments, the freewheeling roller 270 can include a series of cogs (not shown but equivalent to those disposed on the drive shaft 256).

The freewheeling roller 270 can be mounted to the top frame 220, with a mounting assembly 275, one of which can be formed on each of the conveyor guides 230 and 231.

The mounting assembly 275 can include a bracket 276 welded to each of the respective conveyor guides 230 and 231. The bracket 276 includes an extension arm 277, that can be extended from an extension housing 278 on the bracket 276. The tension in the conveyor belt 210 can be adjusted by extending or retracting the extension arms 277 associated with the respective mounting assemblies 275 formed on each of the conveyor guides 230 and 231.

The distal end of the extension arm 277 can be connected with a bearing and race assembly 279, via bolts, rivets, welds, or the like. The bearings can comprise food grade washdown rated bearings. The two ends of the freewheeling roller 270 can be engaged with the respective bearing and race assemblies 279 thus allowing the conveyor belt 210 to freely turn the freewheeling roller 270 as it is pulled by the drive shaft 256.

The conveyor belt 210 passes below the top frame 220, and can be guided by a series of washdown belting rollers 280. The washdown belting rollers 280, are connected to the structural risers 225 between the bottom frame 215 and top frame 220, with washdown bearings, that allow the washdown belting rollers 280 to spin freely about their axis. In certain embodiments, the washdown belting rollers 280 and washdown bearings can be formed of stainless steel.

In certain embodiments, the conveyor assembly 105 can include three washdown belting rollers 280. The conveyor belt 210 can pass below the washdown belting roller 280 nearer to the product exit end 206, above the center washdown belting roller 280, and then below the washdown belting roller 280 nearer to the product entry end 205. This configuration ensures the conveyor belt 210 moves smoothly along the frame 200. In other embodiments, other arrangements are also possible.

The chilling assembly 110, includes an airflow assembly 115 and a liquid flow assembly 120. The liquid flow assembly 120 sprays a liquid (most commonly water) on and/or around the product passing below on the conveyor belt 210. The airflow assembly 115 further provides airflow through a series of baffles that serve both to direct airflow on the product and to trap heated air and transport the heated air away from the passing product and out of the chilling assembly 110.

The system takes advantage of various forms of heat transfer including, but not necessarily limited to, conduction and convection, to quickly cool the product. For example, heat in the product is conducted from the product to the water provided by the liquid flow assembly 120. In addition, the airflow and liquid flow serve to remove heat from the product via convection.

The primary mechanism of cooling is provided via evaporative cooling. The liquid flow assembly 120 provides liquid spray that covers the product in the liquid (e.g. water). The airflow assembly 115 provides moving air which causes the water on the surface of the product to evaporate. The evaporation of the liquid removes latent heat from the product, thus reducing the temperature of the product.

Figure 3A:
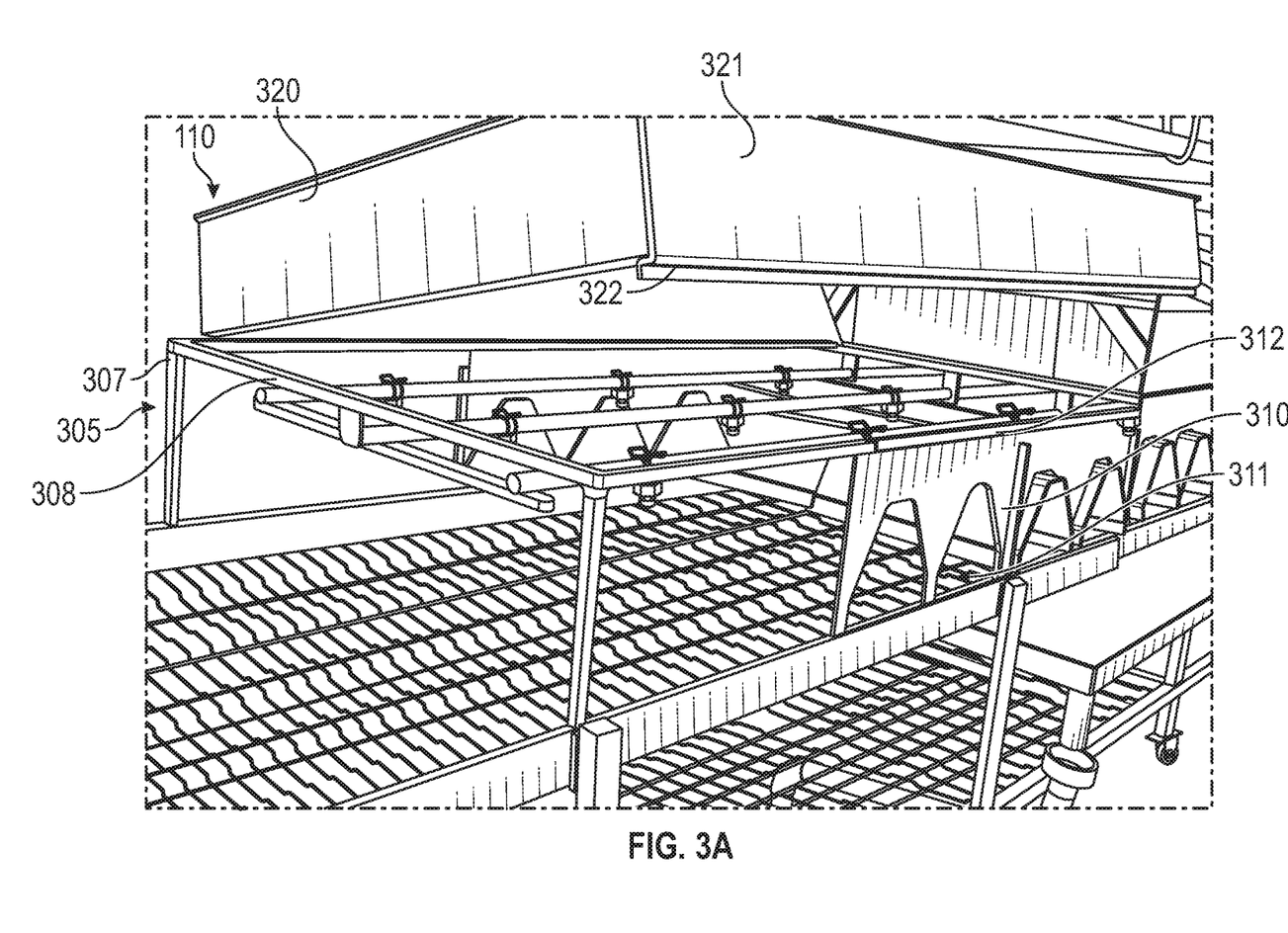
FIG. 3A depicts a partially assembled chilling assembly, in accordance with the disclosed embodiments.

Aspects of the chilling assembly 110 are illustrated in FIG. 3A. The chilling assembly 110, includes a structural support system 305 for the various associated components. The structural support system 305, can comprise legs 307 connected to the conveyor guides 230 and 231. The legs 307 are preferably welded to the conveyor guides 230 and 231 at the points where the vertical structural risers 225 attach to the conveyor guides 230 and 231, to lend structural support. The structural support system 305 further includes horizontal frame 308 connected to the legs 307, which forms a horizontal square or rectangular structure above the conveyor belt 210. It should be appreciated that multiple structural support systems 305 can be used if the length of the product cooling system 100, from the product entry side 205 to the product exit side 206, so requires.

The structural support system 305 includes side panels 310 that can hang vertically from one side of the horizontal frame 308 to the conveyor guide 230. Another side panel 310 can hang vertically from the other side of the horizontal frame 308 to the conveyor guide 231. The side panels 310 thus serves to enclose the sides of the chilling assembly 110. The side panels 310 can comprise a sheet of steel with an upper lip 312 configured to engage the horizontal frame 308. The side panels further include a series baffle cutouts 311. The baffle cutouts 311 are configured to match the shape of the profile of impingement baffles 315 described in further detail herein. In certain embodiments, the baffle cutouts 311 can thus resemble upside down "u"s or "v"s, and are wider nearer to the conveyor guides 230 and 231, and narrower toward the top of the baffle cutout 311.

A hood 320, comprising a box shaped cover can enclose the top of the structural support system 305. In certain embodiments, multiple hoods 320 can be used to cover various sections of the structural support system 305. The vertical sides 321 of the hood 320 can be configured with a lip 322 that engages with the horizontal frame 308 to hold the hood 320 in place. In circumstances where multiple hoods 320 are employed the vertical sides 321 of the hood 320 that would otherwise meet can be removed so that air can flow through the space above the horizontal frame 308. In such cases, a fitting between the hoods can be provided to reduce air leak at the interface. The hood(s) 320 define a space through which air can flow to the product passing on the conveyor belt 210 below.

Figure 3B:
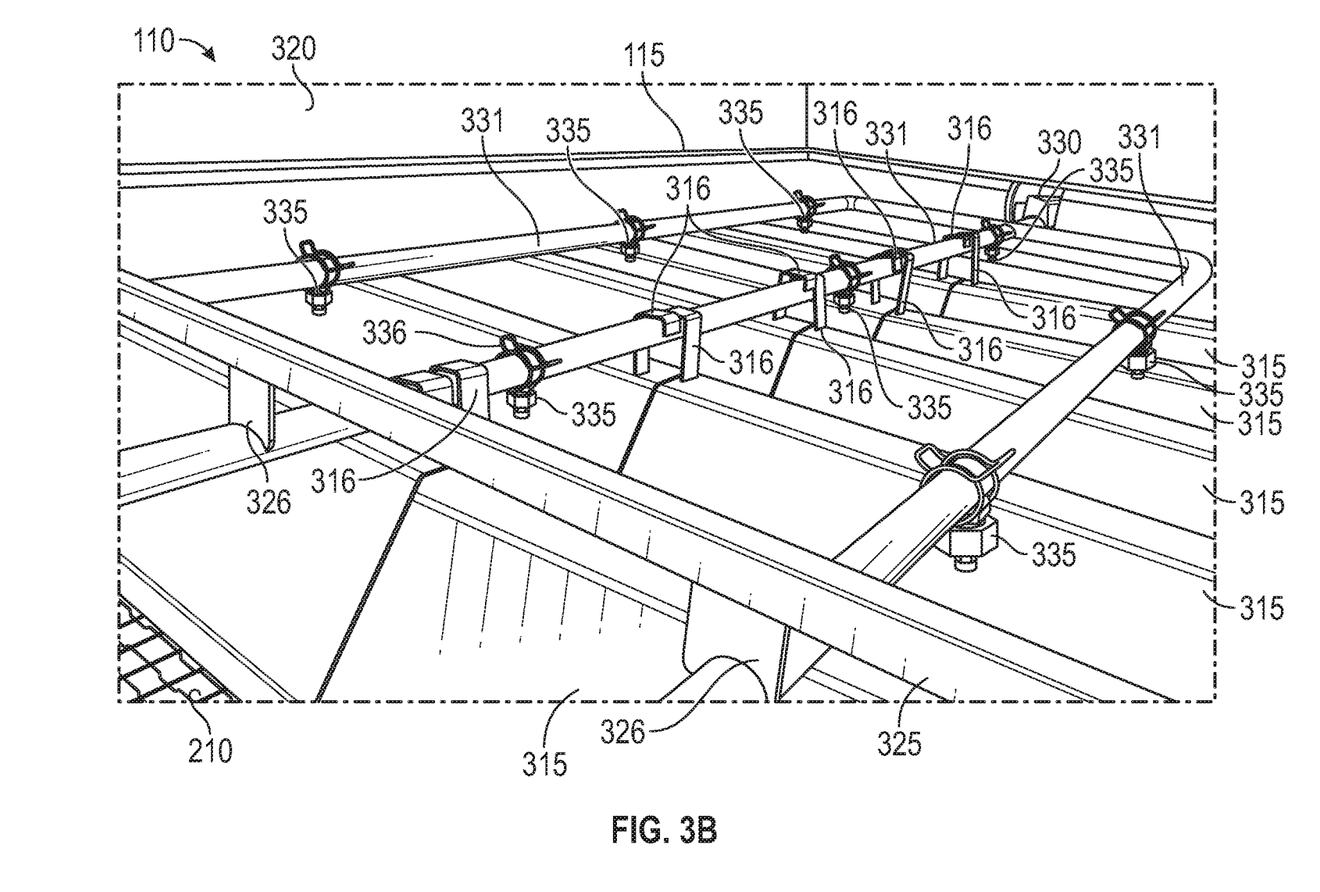
FIG. 3B depicts an inside view of a chilling assembly, in accordance with the disclosed embodiments.

Additional aspects of the chilling assembly 110 are illustrated in FIG. 3B. For example, in FIG. 3B, aspects of the liquid flow assembly 120 are shown. The liquid flow assembly 120 can generally comprise a water distribution system that provides water to a series of spray nozzles. Generally, water can be provided via a main conduit 330 connected to a municipal water source. The main conduit 330 can enter the structural support system 305, preferably at the product entry end 205 of the product cooling system 100, although other entry points may also be acceptable. The main conduit 330 then branches into a series of delivery conduits 331. In FIG. 3B, three delivery conduit lines are shown, but in other embodiments, more or fewer delivery conduits 331 may be used.

A support beam 325 can be provided across the horizontal frame 308. The support beam 325 can include one or more support tabs 326. The support tabs 326 serve as a connection point for the delivery conduits 331, and prevent the lines from sagging. In certain embodiments, the delivery conduits 331 can be biased toward the center of the product cooling system 100 to ensure thorough drainage after use. In certain embodiments the low points in the delivery conduits 331 can include a low point drain.

Each of the delivery conduits 331 is fitted with at least one, and in most cases a series, of nozzles 335. The nozzles 335 can comprise quick disconnect spray nozzles that include a quick disconnect mechanism 336. The nozzles 335 can thus be removed, cleaned, and/or replaced quickly and easily. The nozzles 335 can be sized to maximize water efficiency and selected for atomization of the water distribution to improve heat removal from the product on the conveyor belt 210 below.

The flow of water, provided from the municipal water source (or other water source), flows through the delivery conduits 331 to the nozzles 335, where the water is sprayed downward on the product passing below on the conveyor belt 210.

In certain embodiments, the spacing of each nozzle 335 on each of the delivery conduits 331, can be based on the relative position of the impingement baffles 315. A series of at least one, and preferably multiple removable impingement baffles are configured above the conveyor belt 210. The impingement baffles 315 serve to direct the air forced into the chilling assembly 110 onto the product and then out of the chilling assembly 110.

The impingement baffles 315 comprise metal (e.g. stainless steel) structures, which further comprise an upside down "u" or "v" shape that is narrower at its closed upper portion, and wider at the bottom opened portion. The impingement baffles 315 are configured so that their exterior end fits through the baffle cutouts 311 in the side panels 310. A baffle hanger 316 can be connected to the top of each of the impingement baffles 315, and can be used to hang the impingement baffles 315 from the delivery conduit 331. The impingement baffles 315 are removable so that they can be easily and thoroughly cleaned. Removal of the impingement baffles 315 also eases cleaning of the conveyor assembly 105 components.

FIG. 3B illustrates an exemplary arrangement. In this illustration, the central delivery conduit 331 bisects the length of the structural support system 305. In this embodiment, the series of impingement baffles 315 are organized into sets, with one impingement baffle 315 extending from the center of the structural support system 305 to the baffle cutout 311 on one side of the product chilling assembly 110, and then a paired impingement baffle 315, overlapping and aligned with the first impingement baffle 315 extending from the center of the structural support system 305 to the baffle cutout 311 on the opposing side of the chilling assembly 110. Each of the impingement baffles 315 can have a baffle hanger 316, that allows the impingement baffle 315 to hang from the central delivery conduit 331.

With this arrangement, the pair of aligned impingement baffles 315 forms an air flow guide, perpendicular to the delivery conduit 331, and across the interior of the chilling assembly 110, such that airflow is forced toward the product on the conveyor belt 210. In certain embodiments, multiple pairs of aligned impingement baffles 315 can similarly be disposed in spaced relation, throughout the interior of the chilling assembly 110 defined by the structural support system 305, as illustrated in FIG. 3B.

Returning to the spacing of the nozzles 335 along the delivery conduits 331, in certain embodiments, the nozzles 335 can be located on the delivery conduits 331 above the voids between one set of aligned impingement baffles 315 and the next set of aligned impingement baffles 315. In certain embodiments, the nozzles 335 can be located above every other such void, as illustrated in FIG. 3B, but in other embodiments, other arrangements are possible, provided that the nozzles 335 are located to ensure the water they distribute reaches the product passing below on the conveyor belt 210.

Figure 3C:
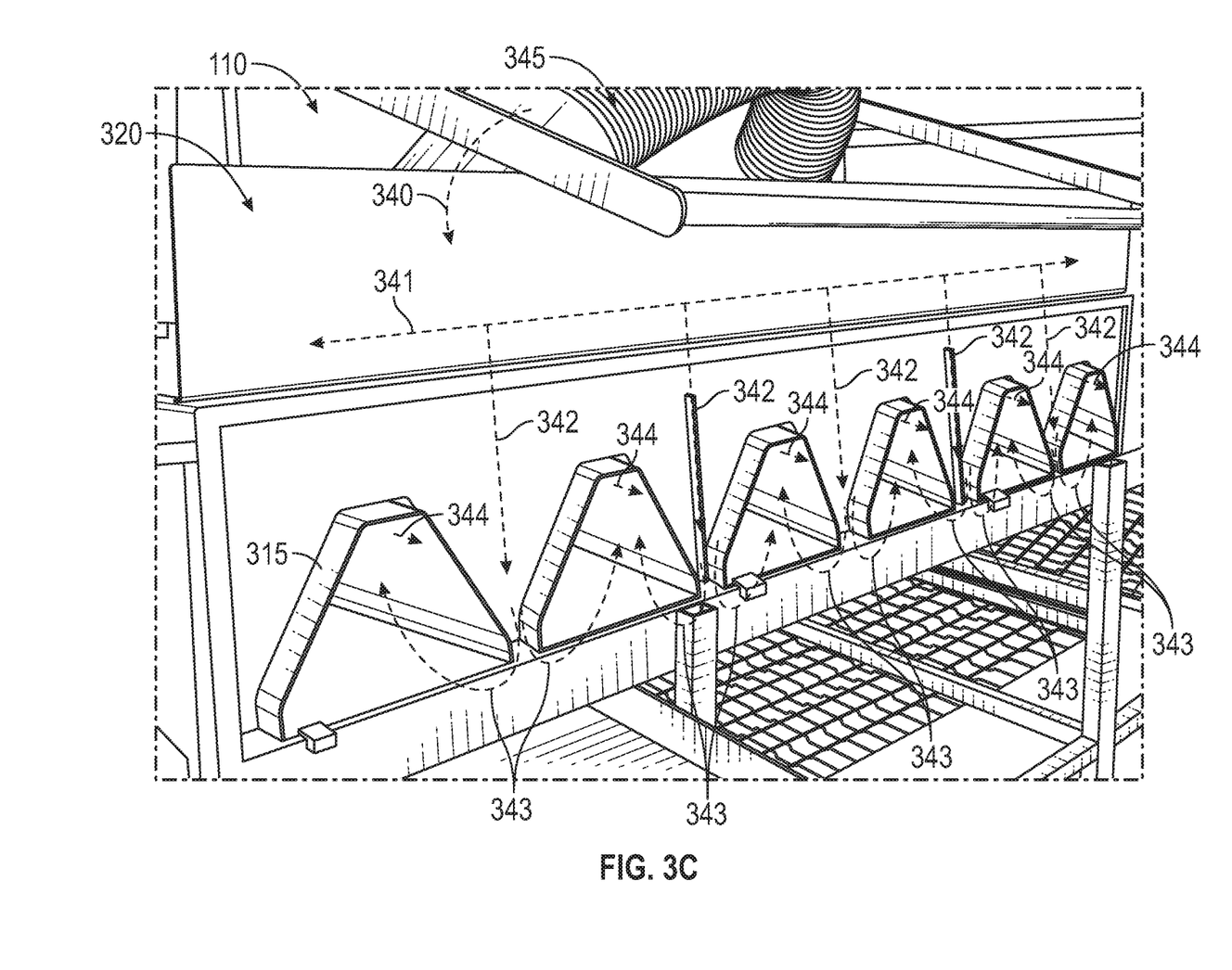
FIG. 3C depicts an airflow diagram associated with a chilling assembly, in accordance with the disclosed embodiments.

The shape of the impingement baffles 315 is selected both to force air on the product below and to maximize heat transfer away from the product on the conveyor belt 210. FIG. 3C illustrates a diagram of the airflow created by the impingement baffles 315 in accordance with the disclosed embodiments.

As illustrated in FIG. 3C, forced air 340 travels through input conduit 345 into the body of the chilling assembly 110 (inside hood 320). It should be understood that forced air 340 may also be provided via additional input conduits, including such a conduit at the product entry end 205 of the product cooling system 100, although such an input conduit is not visible in FIG. 3C.

The airflow 341 is forced through the internal space in the hood 320. The airflow is then forced downward between the impingement baffles 315 as illustrated by airflow 342. The downward airflow 342 exits the spaces between the impingement baffles 315 at their bottom edge where it comes in contact with the product on the conveyor belt 210. The passing product has been damped by the liquid flow assembly 120, so the moving air evaporatively cools the product. As this process takes place the air is heated and begins to rise. This is illustrated by airflow 343. The rising airflow 343 is trapped in the impingement baffles 315. As newly heated air rises, it forces the trapped air in the impingement baffles 315 out the ends of the impingement baffles 315, as illustrated by airflow 344. In this way, the airflow forces the heated air out of the product cooling system 100, to maximize the chilling effect on the product.

It should be understood that the arrows illustrated in FIG. 3C are indicative of an airflow process that occurs throughout the inside the chilling assembly 110, and are provided merely to be illustrative. It should also be understood that the length of the chilling assembly 110, and the number of impingement baffles 315 can be selected according to design consideration to ensure sufficient cooling of the product.

Figure 3D:
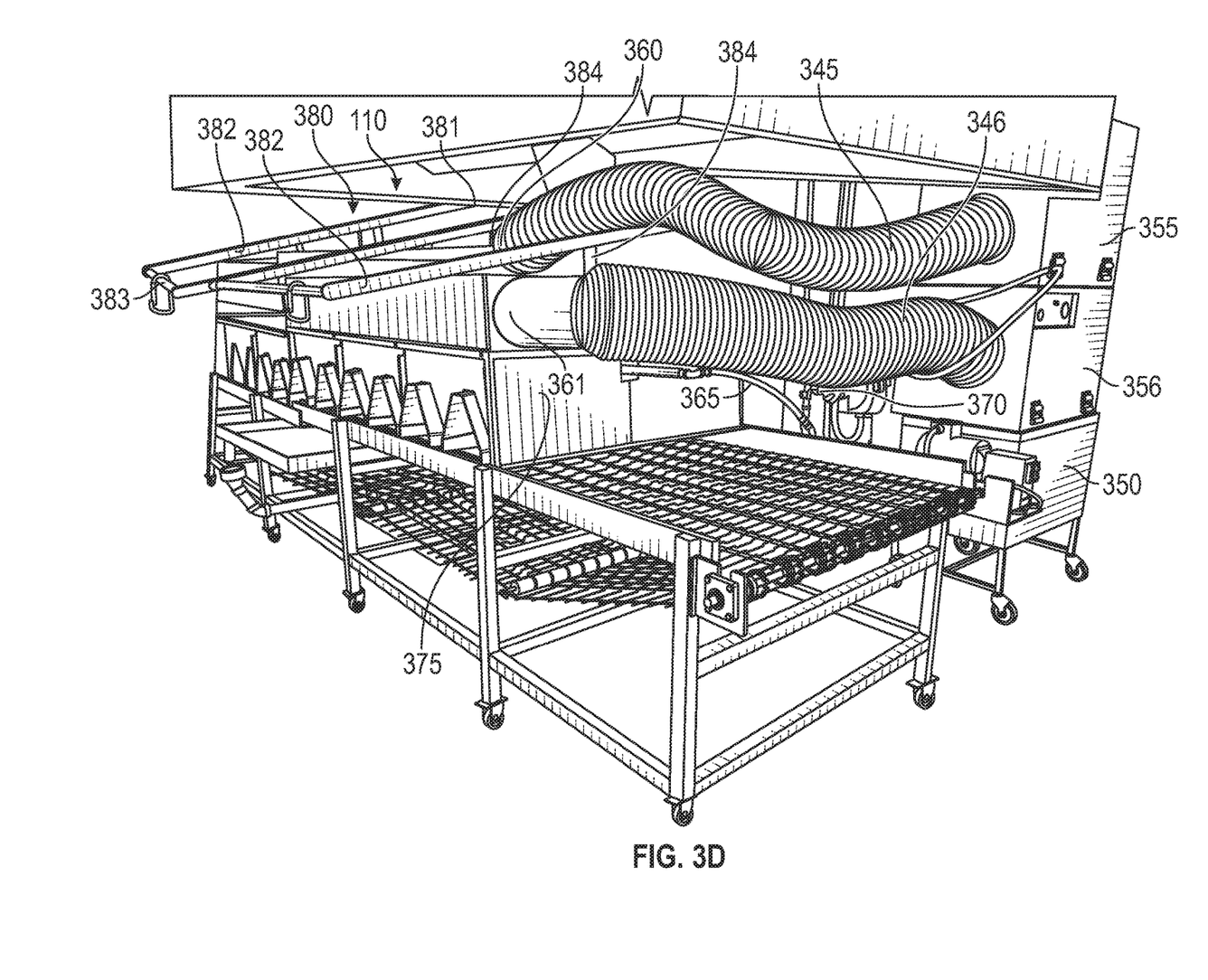
FIG. 3D depicts an external view of components associated with a chilling assembly, in accordance with the disclosed embodiments.

FIG. 3D illustrates additional features of the chilling assembly 110. Specifically, the chilling assembly 110 can further included an air pump 350. The air pump 350 can collect and/or compress ambient air, and supply pressurized air and/or airflow.

The air pump 350 is connected to a first air filter 355 and/or to a second air filter 356. In certain embodiments, the air filters 355 and 356 can comprise High-Efficiency Particulate Air (HEPA) filters. HEPA filters include an inner mesh that filters particulate matter in air forced through the mesh. Air can be pushed through the filters 355 and 356 to input conduit 345 and input conduit 346 respectively, which serve to direct the air into the hood 320. In certain embodiments, the filter 355 can be connected to input conduit 345 and the filter 356 can be connected to input conduit 346, as illustrated in FIG. 3D.

Input connection 360 can be formed between the input conduit 345 and hood 320 and an input connection 361 can be formed between input conduit 346 and hood 320. Input connection 360 can be on the top of the hood 320, and input connection 361 can be on the side of the hood 320 as illustrated in FIG. 3D. In other embodiments, other input locations can also be selected. Input conduit 345 and input conduit 346 can comprise flexible and removable air supply ducting.

With regard to the liquid flow assembly 120, in certain embodiments, a main supply line 365 can connect a municipal water source to the main conduit 330. The water flow to the main conduit 330 can be controlled with a valve 370 in the main supply line 365. The connection between the main supply line 365 and main conduit 330 can be formed in an end plate 375 that encloses the chilling assembly 110 on the product entry side 205. A similar end plate (not shown) can be provided on the product exit side 206 of the chilling assembly 110.

The hood 320 can be operably connected to a safety arm 380. In embodiments where the hood 320 is comprised of multiple hoods covering different sections, a separate safety arm 380 can be provided for each hood 320. The safety arm 380 can comprise U-shaped assembly with two supports 382 and a grab bar 383. Each end of the two supports 382 can have a hinged connection 381, that connects the safety arm 380 to a stable structure such as a wall. A vertical arm 384 can be connected to each of the two supports 382 with a rotating connection. The vertical arms are connected to the top of hood 320. The grab bar 383 extend past the edge of hood 320. The grab bar 383 can be lifted to raise the hood 320 away from the product cooling system 100. This allows access to the internal components of the product cooling system 100 including the impingement baffles 315, water lines, spray nozzles 335, and other components. When in use, the grab bar 383 can be lowered to hold the hood 320 in place on the product cooling system 100, and serves to ensure the hood 320 is not accidentally removed from the product cooling system 100.

Figure 4:
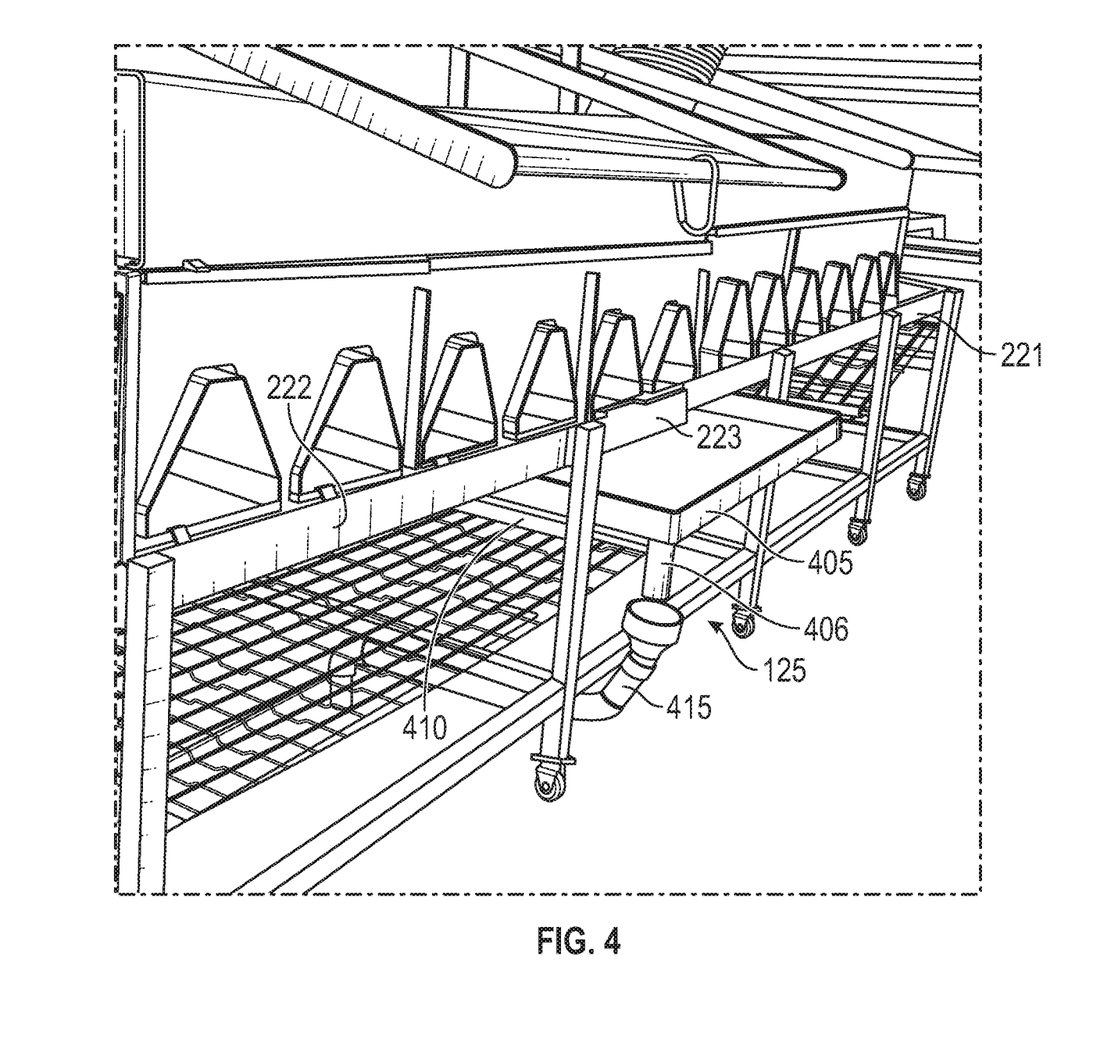
FIG. 4 depicts a waste and drainage assembly, in accordance with the disclosed embodiments.

The product cooling system 100 can also include a waste and drainage system 125, as illustrated in FIG. 4. The waste and drainage system 125 relies on the sloping configuration of the conveyor assembly 105 and chilling assembly 110. A drain pan 405 can be installed below the central low point of the conveyor assembly 105. This location is selected because waste water and other waste products naturally flow to the low point of the conveyor assembly 105.

For example, the meeting point 223 of the table bed 221 and table bed 222 can be substantially in the middle of frame 200. The downward slope of table bed 221 and table bed 222 allows water, and other solid waste, to naturally flow to the meeting point 223. The meeting point 223 can have a gap between table bed 221 and table bed 222 that allows the water and other solid waste to fall into the drain pan 405. The distance of the gap can be selected to ensure that the desired material enters the drainage system 125. The slight slope of table bed 221 and table bed 222 also facilitates cleaning of the system as water and other waste naturally flows and drains at the meeting point 223.

The drain pan 405 is positioned on a drain pan support frame 410, that can be integrated into the frame 200. The drain pan support frame 410 can be a series of cross beams that hold the drain pan 405. One side of the drain pan support frame 410 can be open so that the drain pan 405 can slid into place and/or removed.

The drain pan 405 includes four vertical walls and a pan bed that is tapered to a collection point. The collection point can comprise a hole in the pan bed connected to a drain stem 406. The drain stem 406 can connect to a drain line 415, which can direct the waste water and/or other solid waste to an external waste collection, e.g. a sewer system, solid waste collection, or other such waste collection means.

Figure 5:
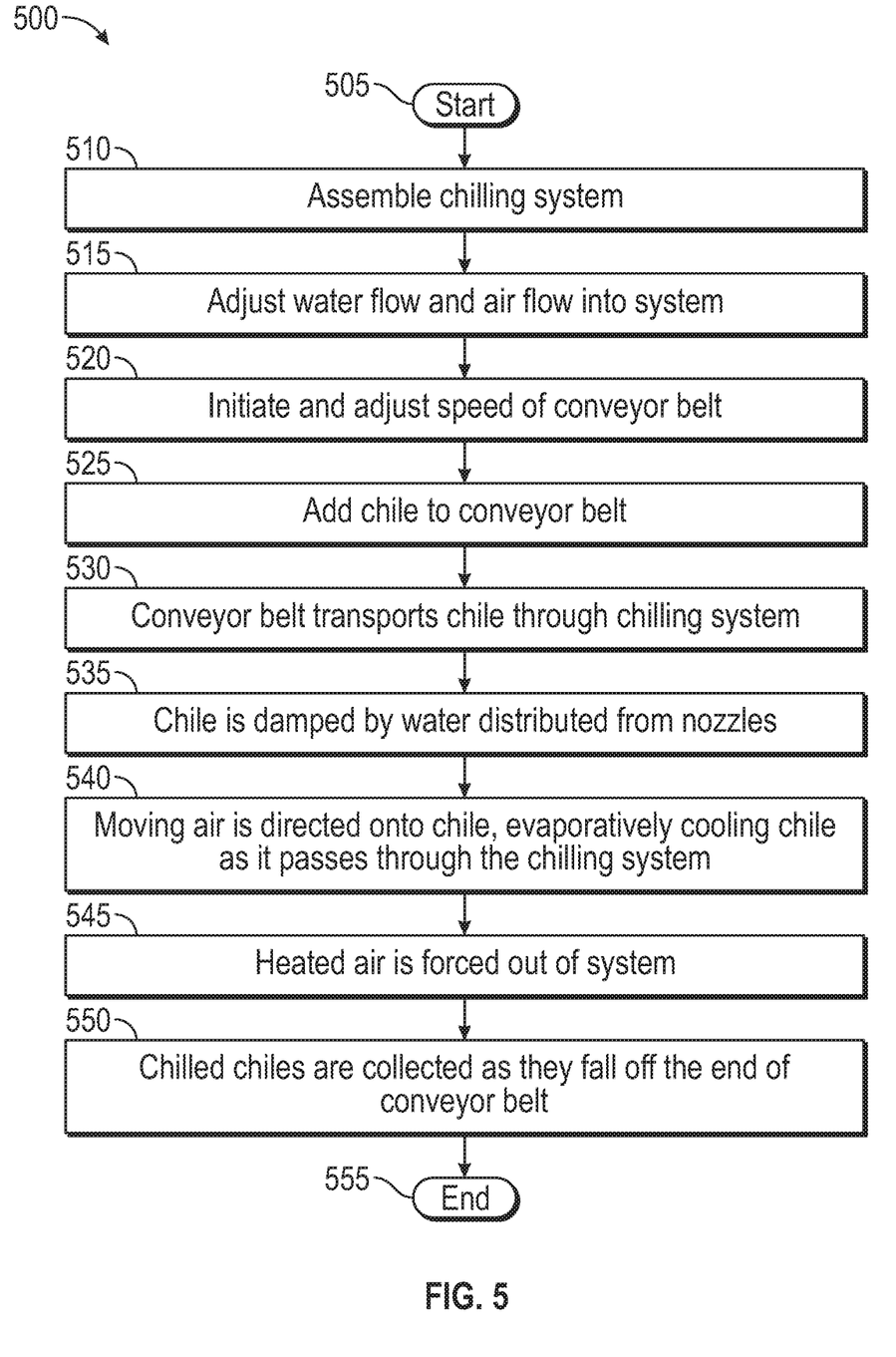
FIG. 5 depicts a method for chilling a product, in accordance with the disclosed embodiments.

FIG. 5 illustrates steps associated with a method 500 for cooling a product. In certain aspects of the disclosed embodiments, the product can comprise chile that has recently been roasted and is ready, but too hot, for packaging. In other embodiments, other products including other roasted foods, can be the target of the product cooling method disclosed herein. It should be appreciated that the method 500 can be implemented with the various systems disclosed herein, including the product cooling system 100. The method begins at step 505.

At step 510, the product cooling system 100 can be assembled by inserting the impingement baffles 315, closing the hood 320, connecting the airflow assembly 115 and liquid flow assembly 120. Before product is introduced to the product cooling system 100, the waterflow and airflow can be adjusted to maximize efficiency and cooling as shown at step 515. The speed of the conveyor belt 210 can also be set at step 520. It should be appreciated that after product is set on the conveyor belt 210 and begins passing through the product cooling system 100, as illustrated at step 525, any of the water flow, airflow, and conveyor belt speed can be adjusted to ensure the system is reducing the temperature of the product to the desired temperature, so that when the product is collected at the product exit end 206 of the conveyor belt 210, it is sufficiently cooled for further processing. Thus, steps 515 and 520 can be appropriately completed or repeated at any stage of the method 500.

At step 530, the conveyor belt 210 transports the chile through the chilling assembly 110. The nozzles 335 associated with the chilling assembly 110 distributed water onto the product passing below, as illustrated at step 535. Likewise, airflow is directed onto the passing chile in the spaces separating the impingement baffles 315. The air flow over the dampened product evaporatively cools the product as it passes through the chilling assembly 110, as shown at step 540. Air that has collected heat from the product rises in the deflector or impingement baffles 315 and is forced out the ends of the impingement baffles 315 as illustrated at step 545. As the chilled product reaches the product exit end 206 of the conveyor belt 210 it can be collected, as shown at step 550, for further processing, including but not limited to, packaging. The method ends at step 555.

Based on the foregoing, it can be appreciated that a number of embodiments, preferred and alternative, are disclosed herein. For example, in an embodiment a system comprises a chilling assembly further comprising a liquid flow assembly and an airflow assembly and a conveyor assembly that conveys product through the chilling assembly, wherein the product is cooled. In an embodiment, the airflow assembly further comprises: an air pump, at least one air filter, and at least one input conduit wherein the air pump drives airflow through the at least one air filter and the at least one input conduit.

In an embodiment, the chilling assembly further comprises a plurality of impingement baffles that direct the airflow, driven through the at least one input conduit, onto the conveyor assembly.

In an embodiment, the liquid flow assembly further comprises a main conduit, at least one delivery conduit attached to the main conduit, and at least one nozzle attached to the delivery conduit wherein liquid is distributed onto the product from the at least one nozzle. In an embodiment, each of the at least one nozzle comprises a quick disconnect spray nozzle. In an embodiment, the liquid flow assembly further comprises a main supply line connecting the main conduit to a water supply and a valve for controlling flow from the water supply.

In an embodiment, the system further comprises a drainage and waste assembly configured to collect waste. In an embodiment, the drainage and waste assembly further comprises a drain pan configured under a meeting point of first table bed and a second table bed, the first table bed and the second table bed being sloped toward the meeting point.

In an embodiment, the conveyor assembly further comprises a conveyor belt, a drive shaft for propelling the conveyor belt, at least one roller for supporting the conveyor belt, and a motor for driving the drive shaft.

In another embodiment, a product cooling system comprises a chilling assembly further comprising: a liquid flow assembly further comprising a main conduit, at least one delivery conduit attached to the main conduit, and at least one nozzle attached to the delivery conduit wherein liquid is distributed onto a product from the at least one nozzle, and an airflow assembly further comprising an air pump and at least one input conduit wherein the air pump drives airflow through the input conduit; a conveyor assembly that conveys the product through the chilling assembly; and a drain pan configured below the conveyor assembly for collecting drainage and waste.

In an embodiment, airflow assembly further comprises a plurality of impingement baffles that direct the airflow driven through the input conduit onto the conveyor assembly. In an embodiment, impingement baffles are configured to expel heated air. In an embodiment, each of the at least one nozzles comprises a quick disconnect spray nozzle.

In another embodiment, a product cooling method comprises transporting product on a conveyor assembly, damping the product on the conveyor assembly with a liquid flow assembly, and driving an airflow onto the product on the conveyor assembly with an airflow assembly thereby cooling the product.

In an embodiment, driving the airflow onto the product on the conveyor assembly further comprises directing the airflow onto the product with a plurality of impingement baffles.

In an embodiment, the method further comprises capturing heated air rising from the product with the impingement baffles and expelling the heated air.

In an embodiment, the method further comprises driving the airflow with an air pump and filtering the air with at least one air filter In an embodiment, damping the product on the conveyor assembly further comprises providing water from a water supply to at least one nozzle with a main conduit connected to at least one delivery conduit and spraying the product with water from the at least one nozzle.

In an embodiment, the method further comprises collecting waste in a drain pan configured under a meeting point of a first table bed and a second table bed, the first table bed and the second table bed being sloped toward the meeting point. In an embodiment, the product comprises chile.

It will be appreciated that variations of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A system comprising:
a chilling assembly further comprising:
   a liquid flow assembly;
   an airflow assembly;
   a plurality of impingement baffles comprising a closed upper portion which is narrower than a bottom opened portion, the plurality of impingement baffles arranged in a horizontal plane with respect to one another with a space between each of the plurality of impingement baffles, with the plurality of impingement baffles being above and substantially perpendicular to a conveyor belt; and
   a baffle hanger attached to a top of each of the plurality of impingement baffles wherein the baffle hanger is configured to hang from a delivery conduit;
a conveyor assembly comprising the conveyor belt that conveys product through said chilling assembly, wherein said product is cooled, the conveyor assembly comprising:
   a bottom frame connected to a top frame with at least one structural riser; wherein the top frame comprises a first sloped table bed and a second sloped table bed; and
a hood configured to enclose a space above the conveyor assembly and an input connection to the airflow assembly on the hood.

2. The system of claim 1 wherein the airflow assembly further comprises: an air pump; at least one air filter; and at least one input conduit wherein said air pump drives an airflow through said at least one air filter and said at least one input conduit.

3. The system of claim 2 wherein said chilling assembly further comprises:
   a side panel configured to hang vertically from a horizontal frame configured above the top frame;
   a baffle cutout in the side panel configured so that an exterior end of one of the plurality of impingement baffles fits through the baffle cutout; wherein the plurality of impingement baffles direct said airflow, driven through said at least one input conduit, onto said conveyor assembly.

4. The system of claim 3 wherein said liquid flow assembly further comprises: a main conduit; wherein the delivery conduit is attached to said main conduit; and at least one nozzle attached to said delivery conduit wherein liquid is distributed onto said product from said at least one nozzle.

5. The system of claim 4 wherein said at least one nozzle comprises: a quick disconnect spray nozzle.

6. The system of claim 4 wherein said liquid flow assembly further comprises:
   a main supply line connecting said main conduit to a water supply; and
   a valve for controlling flow from said water supply;
   wherein the at least one nozzle comprises a plurality of nozzles, wherein each of the plurality of nozzles is configured above the space between each of the plurality of impingement baffles.

7. The system of claim 1 further comprising:
a drainage and waste assembly configured to collect waste.

8. The system of claim 7 wherein said drainage and waste assembly further comprises: a drain pan configured under a meeting point of the first sloped table bed and the second sloped table bed, said first sloped table bed and said second sloped table bed being sloped toward said meeting point, the drain pan being configured below the top frame and above the bottom frame.

9. The system of claim 1 wherein said conveyor assembly further comprises:
   a drive shaft for propelling said conveyor belt;
   at least one roller for supporting said conveyor belt; and
   a motor for driving said drive shaft.

10. A product cooling system comprising: a chilling assembly further comprising:
   a liquid flow assembly further comprising: a main conduit, at least one delivery conduit attached to said main conduit, and at least one nozzle attached to said at least one delivery conduit wherein liquid is distributed onto a product from said at least one nozzle;
   a plurality of impingement baffles comprising a closed upper portion which is narrower than a bottom opened portion the plurality of impingement baffles arranged in a horizontal plane with respect to one another with a space between each of the plurality of impingement baffles, with the plurality of impingement baffles being above and substantially perpendicular to a conveyor belt; and
   a baffle hanger attached to a top of each of the plurality of impingement baffles wherein the baffle hanger is configured to hang from the at least one delivery conduit;
   and an airflow assembly further comprising:
   an air pump and at least one input conduit wherein said air pump drives an airflow through said at least one input conduit;
   a conveyor assembly that conveys said product through said chilling assembly, the conveyor assembly further comprising:
   a bottom frame connected to a top frame with at least one structural riser, and a caster attached to the at least one structural riser; wherein the top frame comprises a first sloped table bed and a second sloped table bed; and a drain pan configured below said conveyor assembly for collecting drainage and waste.

11. The product cooling system of claim 10 wherein said airflow assembly further comprises:
   a side panel configured to hang vertically from a horizontal frame configured above the top frame;
   a baffle cutout in the side panel configured so that an exterior end of one of the plurality of impingement baffles fits through the baffle cutout; wherein the plurality of impingement baffles direct said airflow driven through said at least one input conduit onto said conveyor assembly.

12. The product cooling system of claim 11 wherein said plurality of impingement baffles are configured to expel heated air out the exterior end of the plurality impingement baffles.

13. The product cooling system of claim 12 wherein each of said at least one nozzle comprises:
   a quick disconnect spray nozzle.

14. A product cooling method comprising:
   transporting a product on a conveyor assembly the conveyor assembly comprising a bottom frame connected to a top frame with at least one structural riser between the top frame and bottom frame; a side panel configured to hang vertically from a horizontal frame configured above the top frame, wherein the top frame comprises a first sloped table bed and a second sloped table bed;
   damping said product on said conveyor assembly with a liquid flow assembly; and driving an airflow onto said product on said conveyor assembly with an airflow assembly and a plurality of impingement baffles, the impingement baffles comprising a closed upper portion which is narrower than a bottom opened portion the plurality of impingement baffles arranged in a horizontal plane with respect to one another with a space between each of the plurality of impingement baffles, with the plurality of impingement baffles being above and substantially perpendicular to a conveyor belt, and a baffle hanger attached to each of the plurality of impingement baffles, thereby cooling said product.

15. The product cooling method of claim 14 wherein driving the airflow onto said product on said conveyor assembly further comprises: directing said airflow onto said product with one of the plurality of impingement baffles configured to fit through a baffle cutout in the side panel configured so that an exterior end of the plurality impingement baffles fits through the baffle cutout, and a hood configured to enclose a space above the conveyor assembly and an input connection to the airflow assembly on a side of the hood.

16. The product cooling method of claim 15 further comprising:
capturing heated air rising from said product with said plurality of impingement baffles; and
expelling said heated air out the exterior end of the plurality of impingement baffles.

17. The product cooling method of claim 14 further comprising:
driving said airflow with an air pump; and
filtering said airflow with at least one air filter.

18. The product cooling method of claim 14 wherein damping said product on said conveyor assembly further comprises:
providing water from a water supply to at least one nozzle with a main conduit connected to at least one delivery conduit, wherein the at least one nozzle comprises a plurality of nozzles, wherein each of the plurality of nozzles is configured above the space between each of the plurality of impingement baffles; and
spraying said product with water from said at least one nozzle.

19. The product cooling method of claim 14 further comprising: collecting waste in a drain pan configured under a meeting point of the first sloped table bed and the second sloped table bed, said first sloped table bed, and said second sloped table bed being sloped toward said meeting point.

20. The product cooling method of claim 14 wherein said product comprises chile.

* * * * *